US008537581B2

(12) United States Patent
Wagoner et al.

(10) Patent No.: US 8,537,581 B2
(45) Date of Patent: Sep. 17, 2013

(54) POWER CONVERTER SYSTEM AND METHODS OF OPERATING A POWER CONVERTER SYSTEM

(75) Inventors: Robert Gregory Wagoner, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/218,271

(22) Filed: Aug. 25, 2011

(65) Prior Publication Data

US 2012/0051102 A1 Mar. 1, 2012

(51) Int. Cl.
*H02M 3/24* (2006.01)

(52) U.S. Cl.
USPC ............... 363/95; 363/40; 363/41; 363/98; 363/131; 363/132

(58) Field of Classification Search
USPC ............ 363/34, 35, 97, 98, 123, 125, 127, 363/124, 40, 41, 56.01, 56.02, 131, 132
See application file for complete search history.

(56) References Cited

U.S. PATENT DOCUMENTS

| | | | |
|---|---|---|---|
| 6,058,035 A * | 5/2000 | Madenokouji et al. | ......... 363/95 |
| 6,914,418 B2 | 7/2005 | Sung | |
| 7,099,169 B2 | 8/2006 | West et al. | |
| 7,479,774 B2 | 1/2009 | Wai et al. | |
| 7,855,906 B2 | 12/2010 | Klodowski et al. | |
| 2008/0049467 A1* | 2/2008 | Takayanagi | ................ 363/56.03 |
| 2008/0278983 A1* | 11/2008 | Park | ................ 363/95 |
| 2009/0121549 A1* | 5/2009 | Leonard | ......................... 307/51 |
| 2009/0316453 A1* | 12/2009 | Manabe et al. | ................ 363/78 |
| 2010/0071742 A1 | 3/2010 | de Rooij et al. | |
| 2010/0133904 A1 | 6/2010 | Klodowski et al. | |
| 2011/0013432 A1 | 1/2011 | Wagoner | |
| 2011/0090726 A1* | 4/2011 | Brotto et al. | ................. 363/131 |
| 2011/0096579 A1 | 4/2011 | Klodowski et al. | |
| 2012/0026769 A1* | 2/2012 | Schroeder et al. | ............ 363/131 |
| 2012/0051101 A1* | 3/2012 | El-Barbari et al. | ............. 363/49 |

* cited by examiner

*Primary Examiner* — Nguyen Tran
(74) *Attorney, Agent, or Firm* — James McGinness; Armstrong Teasdale LLP

(57) ABSTRACT

A power converter system includes a converter configured to be coupled to a power generation unit for receiving power from the power generation unit, and a bus coupled to the converter, wherein a voltage is generated across the bus when electricity is conducted through the power converter system. The power converter system also includes an inverter coupled to the bus and configured to supply power to an electrical distribution network, and a control system coupled to the converter and to the inverter. The control system is configured to gradually adjust the voltage across the bus during at least one of a shutdown sequence and a startup sequence of the power converter system.

13 Claims, 3 Drawing Sheets

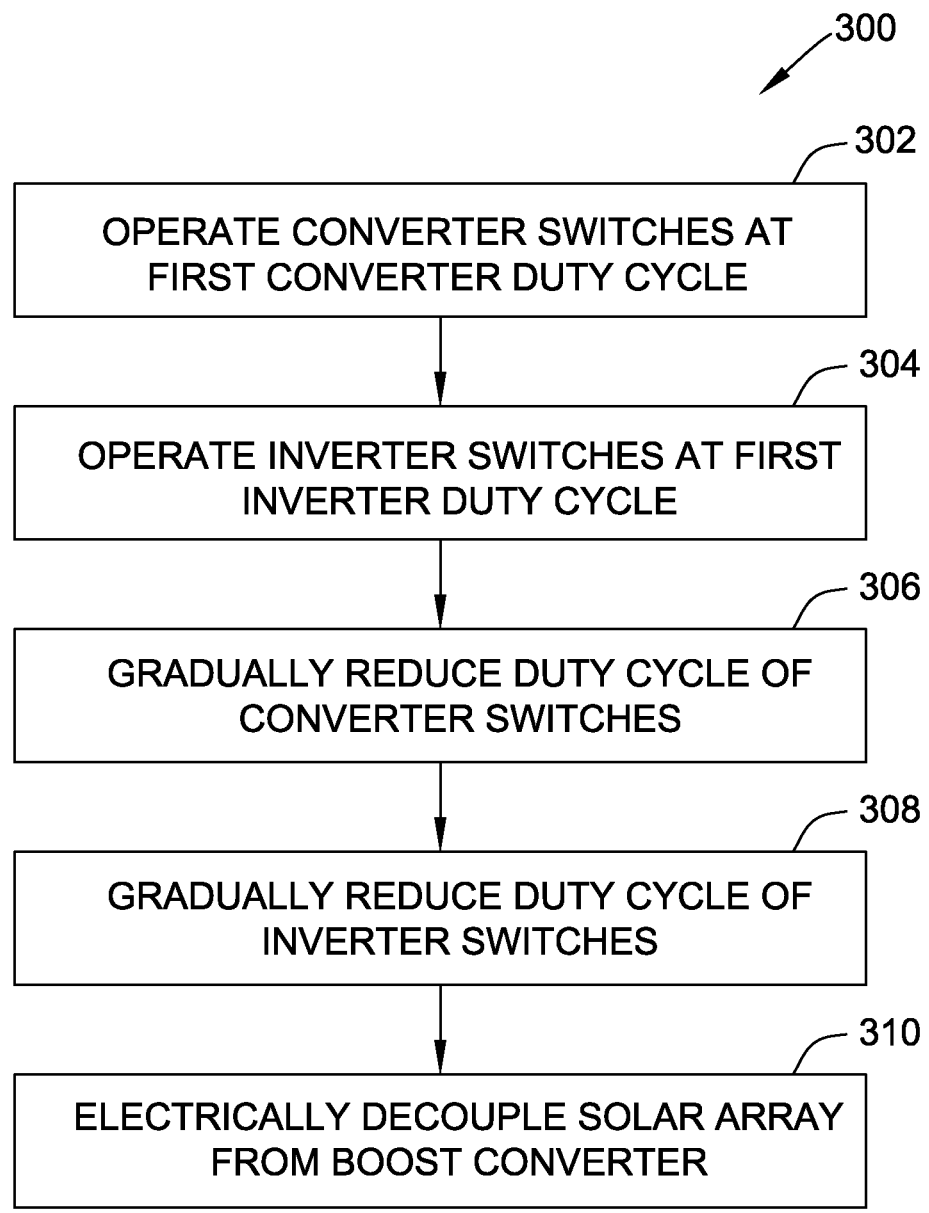

POWER CONVERTER SYSTEM AND METHODS OF OPERATING A POWER CONVERTER SYSTEM

BACKGROUND OF THE INVENTION

The subject matter described herein relates generally to power systems and, more particularly, to a power converter system and methods of operating the power converter system.

In some known solar power systems, a plurality of photovoltaic panels (also known as solar panels) are logically or physically grouped together to form an array of solar panels. The solar panel array converts solar energy into electrical energy and transmits the energy to an electrical grid or other destination.

Solar panels generally output direct current (DC) electrical power. To properly couple such solar panels to an electrical grid, the electrical power received from the solar panels must be converted to alternating current (AC). At least some known power systems use a power converter to convert DC power to AC power. If, however, the power converter is disabled (i.e., "shut down") or enabled (i.e., "started up") quickly, an undesired voltage amplitude may be generated within the power converter. Accordingly, the power converter may be damaged and/or an operational lifetime of the power converter may be reduced.

BRIEF DESCRIPTION OF THE INVENTION

In one embodiment, a power converter system is provided that includes a converter configured to be coupled to a power generation unit for receiving power from the power generation unit, and a bus coupled to the converter, wherein a voltage is generated across the bus when electricity is conducted through the power converter system. The power converter system also includes an inverter coupled to the bus and configured to supply power to an electrical distribution network, and a control system coupled to the converter and to the inverter. The control system is configured to gradually adjust the voltage across the bus during at least one of a shutdown sequence and a startup sequence of the power converter system.

In another embodiment, a method of operating a power converter system is provided that includes electrically coupling a solar panel array to a converter including a plurality of converter switches, wherein the converter is coupled to an inverter including a plurality of inverter switches. The method also includes gradually increasing a duty cycle of the plurality of inverter switches, gradually increasing a duty cycle of the plurality of converter switches, and supplying power from the solar panel array to an electrical distribution network.

In yet another embodiment, a method of operating a power converter system including an inverter and a converter is provided. The method includes operating a plurality of converter switches at a first converter duty cycle, wherein the plurality of converter switches are included within the converter, and wherein the converter is coupled to a solar panel array. The method also includes operating a plurality of inverter switches at a first inverter duty cycle, wherein the plurality of inverter switches are included within the inverter. The method also includes gradually reducing a duty cycle of the plurality of converter switches, gradually reducing a duty cycle of the plurality of inverter switches, and electrically decoupling the solar panel array from the converter.

BRIEF DESCRIPTION OF THE DRAWINGS

FIG. 3 is a flow diagram of an exemplary shutdown sequence of a power converter that may be used with the power generation system shown in FIG. 1.

DETAILED DESCRIPTION OF THE INVENTION

As described herein, a power generation system includes a power converter and at least one power generation unit, such as a solar array. The power converter includes a boost converter coupled to the solar array, and an inverter coupled to the boost converter by a DC bus. The inverter is coupled to an electrical distribution network for supplying electrical energy to the network. A converter controller controls the operation of the boost converter, and an inverter controller controls the operation of the inverter. The converter controller adjusts a duty cycle of a plurality of converter switches within the converter, and the inverter controller adjusts a duty cycle of a plurality of inverter switches within the inverter. If a shutdown event or a low irradiance event occurs, the duty cycle of the converter switches is gradually reduced such that a voltage across the DC bus is gradually reduced. The duty cycle of the inverter switches is then gradually reduced such that an amount of power supplied to the electrical distribution network is gradually reduced. If a startup event or a high irradiance event occurs, the duty cycle of the inverter switches is gradually increased such that an amount of power supplied to the electrical distribution network is gradually increased. The duty cycle of the converter switches is then gradually increased such that the voltage across the DC bus is gradually increased. Accordingly, the power converter and the methods described herein enable the power generation system to operate during shutdown events, startup events, low irradiance events, and high irradiance events without sustaining undesired voltage amplitudes across the DC bus and without producing rapid changes in the power supplied to the electrical distribution network.

As used herein, the term "gradual" refers to an adjustment that is accomplished over a period of time and that includes a plurality of intermediate values, rather than an instantaneous or substantially instantaneous adjustment from a first value to a second value. For example, a duty cycle may be gradually adjusted if the duty cycle changes from a first value to a second value during a time period of about 50 milliseconds (ms) or greater such that the duty cycle is set to a plurality of increasing or decreasing intermediate values between the first value and the second value. Alternatively, the duty cycle may be gradually adjusted by changing from the first value to the second value during a time period of about 100 ms or greater, or any other time period that enables the duty cycle to be adjusted such that the duty cycle is set to a plurality of increasing or decreasing intermediate values between the first value and the second value.

Figure 1:
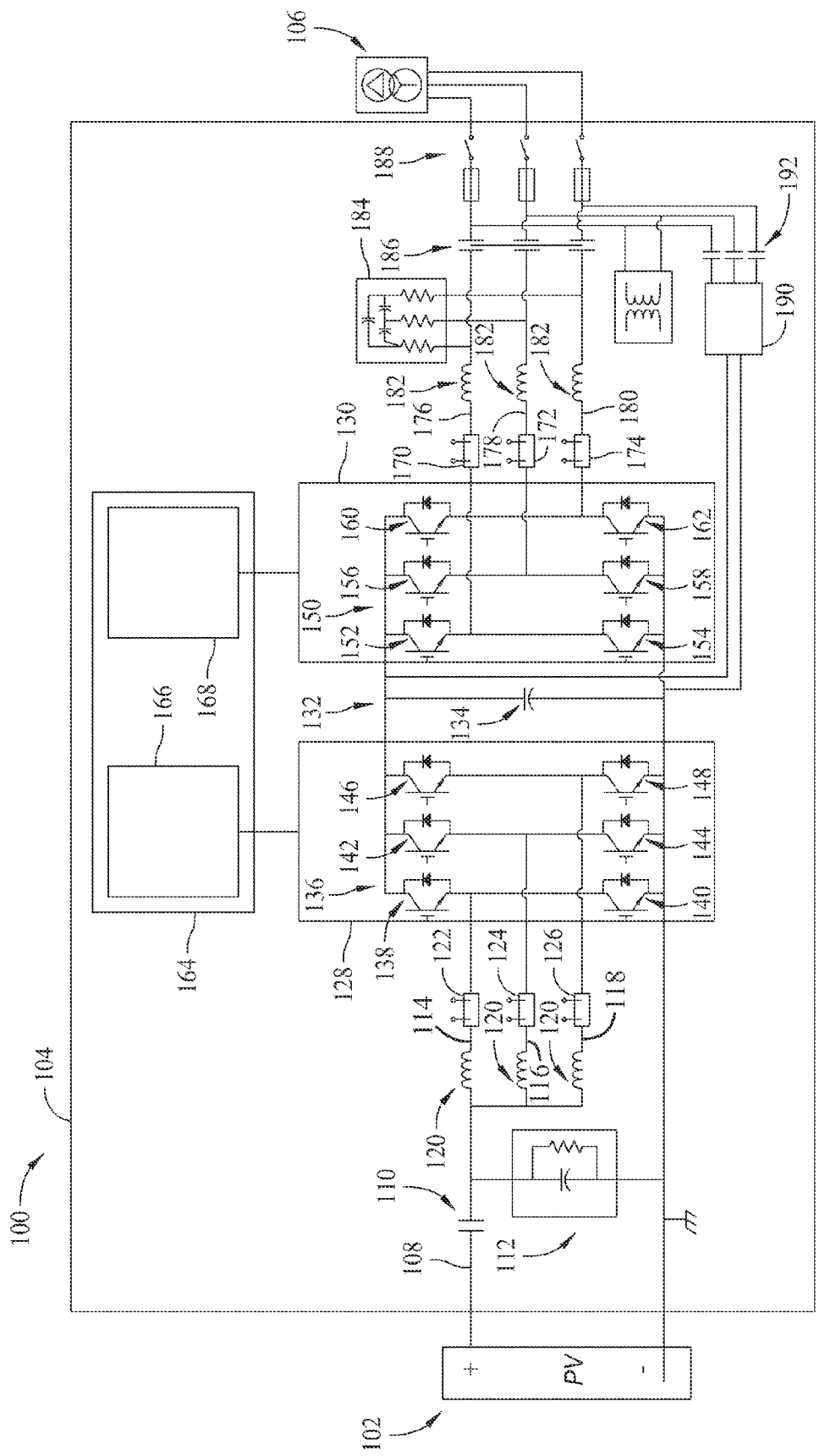
FIG. 1 is a schematic diagram of an exemplary power generation system.

FIG. 1 is a schematic diagram of an exemplary power generation system 100 that includes a plurality of power generation units, such as a plurality of solar panels (not shown) that form at least one solar array 102. Alternatively, power generation system 100 includes any suitable number and type of power generation units, such as a plurality of wind turbines, fuel cells, geothermal generators, hydropower generators, and/or other devices that generate power from renewable and/or non-renewable energy sources.

In the exemplary embodiment, power generation system 100 and/or solar array 102 includes any number of solar panels to facilitate operating power generation system 100 at a desired power output. In one embodiment, power generation system 100 includes a plurality of solar panels and/or solar arrays 102 coupled together in a series-parallel configuration to facilitate generating a desired current and/or voltage output from power generation system 100. Solar panels include, in one embodiment, one or more of a photovoltaic panel, a solar thermal collector, or any other device that converts solar energy to electrical energy. In the exemplary embodiment, each solar panel is a photovoltaic panel that generates a substantially direct current (DC) power as a result of solar energy striking solar panels.

In the exemplary embodiment, solar array 102 is coupled to a power converter 104, or a power converter system 104, that converts the DC power to alternating current (AC) power. The AC power is transmitted to an electrical distribution network 106, or "grid." Power converter 104, in the exemplary embodiment, adjusts an amplitude of the voltage and/or current of the converted AC power to an amplitude suitable for electrical distribution network 106, and provides AC power at a frequency and a phase that are substantially equal to the frequency and phase of electrical distribution network 106. Moreover, in the exemplary embodiment, power converter 104 provides three phase AC power to electrical distribution network 106. Alternatively, power converter 104 provides single phase AC power or any other number of phases of AC power to electrical distribution network 106.

DC power generated by solar array 102, in the exemplary embodiment, is transmitted through a converter conductor 108 coupled to power converter 104. In the exemplary embodiment, a protection device 110 electrically disconnects solar array 102 from power converter 104, for example, if an error or a fault occurs within power generation system 100. As used herein, the terms "disconnect" and "decouple" are used interchangeably, and the terms "connect" and "couple" are used interchangeably. Current protection device 110 is a circuit breaker, a fuse, a contactor, and/or any other device that enables solar array 102 to be controllably disconnected from power converter 104. A DC filter 112 is coupled to converter conductor 108 for use in filtering an input voltage and/or current received from solar array 102.

Converter conductor 108, in the exemplary embodiment, is coupled to a first input conductor 114, a second input conductor 116, and a third input conductor 118 such that the input current is split between first, second, and third input conductors 114, 116, and 118. Alternatively, the input current may be conducted to a single conductor, such as converter conductor 108, and/or to any other number of conductors that enables power generation system 100 to function as described herein. At least one boost inductor 120 is coupled to each of first input conductor 114, second input conductor 116, and/or third input conductor 118. Boost inductors 120 facilitate filtering the input voltage and/or current received from solar array 102. In addition, at least a portion of the energy received from solar array 102 is temporarily stored within each boost inductor 120.

In the exemplary embodiment, a first input current sensor 122 is coupled to first input conductor 114, a second input current sensor 124 is coupled to second input conductor 116, and a third input current sensor 126 is coupled to third input conductor 118. First, second, and third input current sensors 122, 124, and 126 measure the current flowing through first, second, and third input conductors 114, 116, and 118, respectively.

In the exemplary embodiment, power converter 104 includes a DC to DC, or "boost," converter 128 and an inverter 130 coupled together by a DC bus 132. Boost converter 128, in the exemplary embodiment, is coupled to, and receives DC power from, solar array 102 through first, second, and third input conductors 114, 116, and 118. Moreover, boost converter 128 adjusts the voltage and/or current amplitude of the DC power received. In the exemplary embodiment, inverter 130 is a DC-AC inverter that converts DC power received from boost converter 128 into AC power for transmission to electrical distribution network 106. Moreover, in the exemplary embodiment, DC bus 132 includes at least one capacitor 134. Alternatively, DC bus 132 includes a plurality of capacitors 134 and/or any other electrical power storage devices that enable power converter 104 to function as described herein. As current is transmitted through power converter 104, a voltage is generated across DC bus 132 and energy is stored within capacitors 134.

Boost converter 128, in the exemplary embodiment, includes two converter switches 136 coupled together in serial arrangement for each phase of electrical power that power converter 104 produces. In the exemplary embodiment, converter switches 136 are insulated gate bipolar transistors (IGBTs). Alternatively, converter switches 136 are any other suitable transistor or any other suitable switching device. Moreover, each pair of converter switches 136 for each phase is coupled in parallel with each pair of converter switches 136 for each other phase. As such, for a three phase power converter 104, boost converter 128 includes a first converter switch 138 coupled in series with a second converter switch 140, a third converter switch 142 coupled in series with a fourth converter switch 144, and a fifth converter switch 146 coupled in series with a sixth converter switch 148. First and second converter switches 138 and 140 are coupled in parallel with third and fourth converter switches 142 and 144, and with fifth and sixth converter switches 146 and 148. Alternatively, boost converter 128 may include any suitable number of converter switches 136 arranged in any suitable configuration.

Inverter 130, in the exemplary embodiment, includes two inverter switches 150 coupled together in serial arrangement for each phase of electrical power that power converter 104 produces. In the exemplary embodiment, inverter switches 150 are insulated gate bipolar transistors (IGBTs). Alternatively, inverter switches 150 are any other suitable transistor or any other suitable switching device. Moreover, each pair of inverter switches 150 for each phase is coupled in parallel with each pair of inverter switches 150 for each other phase. As such, for a three phase power converter 104, inverter 130 includes a first inverter switch 152 coupled in series with a second inverter switch 154, a third inverter switch 156 coupled in series with a fourth inverter switch 158, and a fifth inverter switch 160 coupled in series with a sixth inverter switch 162. First and second inverter switches 152 and 154 are coupled in parallel with third and fourth inverter switches 156 and 158, and with fifth and sixth inverter switches 160 and 162. Alternatively, inverter 130 may include any suitable number of inverter switches 150 arranged in any suitable configuration.

Power converter 104 includes a control system 164 that includes a converter controller 166 and an inverter controller 168. Converter controller 166 is coupled to, and controls an operation of, boost converter 128. More specifically, in the exemplary embodiment, converter controller 166 operates boost converter 128 to maximize the power received from solar array 102. Inverter controller 168 is coupled to, and controls the operation of, inverter 130. More specifically, in the exemplary embodiment, inverter controller 168 operates inverter 130 to regulate the voltage across DC bus 132 and/or to adjust the voltage, current, phase, frequency, and/or any other characteristic of the power output from inverter 130 to substantially match the characteristics of electrical distribution network 106.

In the exemplary embodiment control system 164, converter controller 166, and/or inverter controller 168 include and/or are implemented by at least one processor. As used herein, the processor includes any suitable programmable circuit such as, without limitation, one or more systems and microcontrollers, microprocessors, reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor." In addition, control system 164, converter controller 166, and/or inverter controller 168 include at least one memory device (not shown) that stores computer-executable instructions and data, such as operating data, parameters, setpoints, threshold values, and/or any other data that enables control system 164 to function as described herein.

Converter controller 166, in the exemplary embodiment, receives current measurements from first input current sensor 122, second input current sensor 124, and/or third input current sensor 126. Moreover, converter controller 166 receives measurements of a voltage of first input conductor 114, second input conductor 116, and/or third input conductor 118 from a plurality of input voltage sensors (not shown). Inverter controller 168, in the exemplary embodiment, receives current measurements from a first output current sensor 170, a second output current sensor 172, and/or a third output current sensor 174. Moreover, inverter controller 168 receives measurements of a voltage output from inverter 130 from a plurality of output voltage sensors (not shown). In the exemplary embodiment, converter controller 166 and/or inverter controller 168 receive voltage measurements of the voltage of DC bus 132 from a DC bus voltage sensor (not shown).

In the exemplary embodiment, inverter 130 is coupled to electrical distribution network 106 by a first output conductor 176, a second output conductor 178, and a third output conductor 180. Moreover, in the exemplary embodiment, inverter 130 provides a first phase of AC power to electrical distribution network 106 through first output conductor 176, a second phase of AC power to electrical distribution network 106 through second output conductor 178, and a third phase of AC power to electrical distribution network 106 through third output conductor 180. First output current sensor 170 is coupled to first output conductor 176 for measuring the current flowing through first output conductor 176. Second output current sensor 172 is coupled to second output conductor 178 for measuring the current flowing through second output conductor 178, and third output current sensor 174 is coupled to third output conductor 180 for measuring the current flowing through third output conductor 180.

At least one inductor 182 is coupled to each of first output conductor 176, second output conductor 178, and/or third output conductor 180. Inductors 182 facilitate filtering the output voltage and/or current received from inverter 130. Moreover, in the exemplary embodiment, an AC filter 184 is coupled to first output conductor 176, second output conductor 178, and/or third output conductor 180 for use in filtering an output voltage and/or current received from conductors 176, 178, and 180.

In the exemplary embodiment, at least one contactor 186 and/or at least one disconnect switch 188 are coupled to first output conductor 176, second output conductor 178, and/or third output conductor 180. Contactors 186 and disconnect switches 188 electrically disconnect inverter 130 from electrical distribution network 106, for example, if an error or a fault occurs within power generation system 100. Moreover, in the exemplary embodiment, protection device 110, contactors 186 and disconnect switches 188 are controlled by control system 164. Alternatively, protection device 110, contactors 186 and/or disconnect switches 188 are controlled by any other system that enables power converter 104 to function as described herein.

Power converter 104 also includes a bus charger 190 that is coupled to first output conductor 176, second output conductor 178, third output conductor 180, and to DC bus 132. In the exemplary embodiment, at least one charger contactor 192 is coupled to bus charger 190 for use in electrically disconnecting bus charger 190 from first output conductor 176, second output conductor 178, and/or third output conductor 180. Moreover, in the exemplary embodiment, bus charger 190 and/or charger contactors 192 are controlled by control system 164 for use in charging DC bus 132 to a predetermined voltage.

During operation, in the exemplary embodiment, solar array 102 generates DC power and transmits the DC power to boost converter 128. Converter controller 166 controls a switching of converter switches 136 to adjust an output of boost converter 128. More specifically, in the exemplary embodiment, converter controller 166 controls the switching of converter switches 136 to adjust the voltage and/or current received from solar array 102 such that the power received from solar array 102 is increased and/or maximized.

Inverter controller 168, in the exemplary embodiment, controls a switching of inverter switches 150 to adjust an output of inverter 130. More specifically, in the exemplary embodiment, inverter controller 168 uses a suitable control algorithm, such as pulse width modulation (PWM) and/or any other control algorithm, to transform the DC power received from boost converter 128 into three phase AC power signals. Alternatively, inverter controller 168 causes inverter 130 to transform the DC power into a single phase AC power signal or any other signal that enables power converter 104 to function as described herein.

In the exemplary embodiment, each phase of the AC power is filtered by AC filter 184, and the filtered three phase AC power is transmitted to electrical distribution network 106. In the exemplary embodiment, three phase AC power is also transmitted from electrical distribution network 106 to DC bus 132 by bus charger 190. In one embodiment, bus charger 190 uses the AC power to charge DC bus 132 to a suitable voltage amplitude, for example, during a startup and/or a shutdown sequence of power converter 104.

Figure 2:
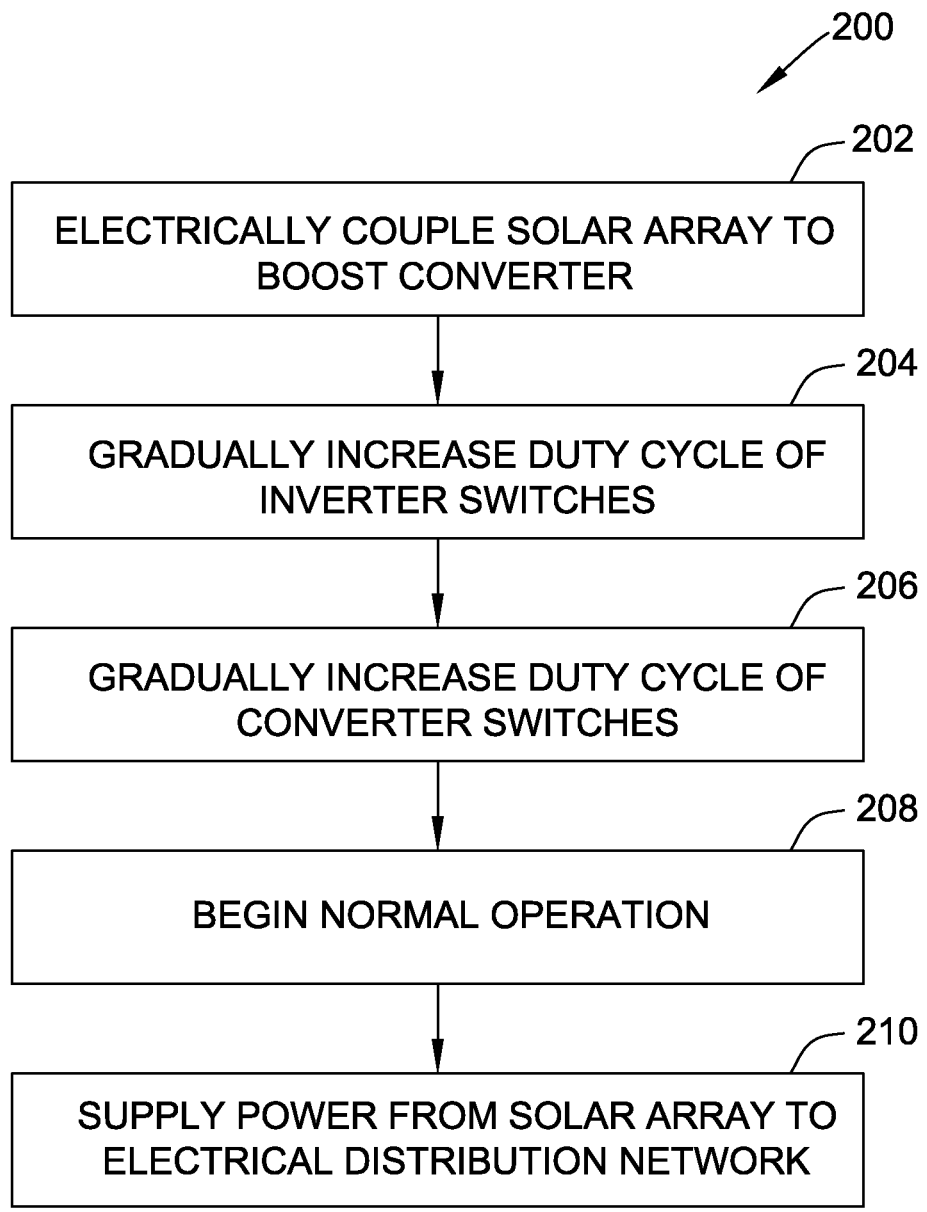
FIG. 2 is a flow diagram of an exemplary startup sequence of a power converter that may be used with the power generation system shown in FIG. 1.

FIG. 2 is a flow diagram of an exemplary method 200 of operating power converter 104 (shown in FIG. 1) during a startup sequence of converter 104. In the exemplary embodiment, method 200 is implemented by control system 164, such as by converter controller 166 and/or inverter controller 168 (all shown in FIG. 1), in response to an occurrence of a startup event and/or a high irradiance event. Alternatively, method 200 may be implemented by any other system that enables power converter 104 to function as described herein.

As used herein, the term "startup event" refers to an event in which a command signal is received from control system 164 and/or another system or device to enable, or "start up," power converter 104 in preparation for electrically coupling solar array 102 to electrical distribution network 106 to supply power to network 106. As used herein, the term "high irradiance event" refers to an event in which the irradiance of solar array 102 is detected or determined to be above a predefined irradiance threshold. For example, in high sunlight conditions, such as during a sunny day, the irradiance of solar array 102 may be above the predefined irradiance threshold. The irradiance may be determined by one or more sensors (not shown) within or coupled to solar array 102, and/or may be determined based on the current detected by first input current sensor 122, second input current sensor 124, and/or third input current sensor 126 (shown in FIG. 1).

In the exemplary embodiment, before method 200 (i.e., the startup sequence) is executed, the duty cycles of converter switches 136 and inverter switches 150 are equal to about zero and protection device 110 is open such that solar array 102 is electrically decoupled from boost converter 128. Accordingly, no current and/or power is delivered from solar array 102 to electrical distribution network 106.

When method 200 is executed, protection device 110 is closed to electrically couple 202 solar array 102 to boost converter 128. The duty cycle of inverter switches 150 is gradually increased 204 by inverter controller 168. In the exemplary embodiment, the duty cycle of inverter switches 150 is increased 204 linearly from a first inverter duty cycle of about zero to an operating, or second inverter duty cycle. Alternatively, the duty cycle of inverter switches 150 is increased 204 using any other suitable rate or function that enables power converter 104 to function as described herein.

In the exemplary embodiment, the rate of the inverter duty cycle increase is at least partially based on characteristics or operating parameters of electrical distribution network 106. In one embodiment, the duty cycle of inverter switches 150 is increased 204 from about zero to the operating inverter duty cycle over a period of about one second. Alternatively, the duty cycle may be increased 204 to the operating inverter duty cycle over any other suitable period of time.

In an alternative embodiment, the duty cycle of inverter switches 150 is gradually increased 204 while the duty cycle of converter switches 136 is being increased 206 (as described herein). For example, the duty cycle of inverter switches 150 may be increased 204 after the duty cycle of converter switches 136 is above a predetermined threshold, or after a predetermined time period has elapsed from the time that converter controller 166 commences increasing 206 the duty cycle of converter switches 136.

After the duty cycle of inverter switches 150 has been increased 204 to the operating inverter duty cycle (or while the duty cycle of inverter switches 150 is being increased 204), the duty cycle of converter switches 136 is gradually increased 206 by converter controller 166. More specifically, in the exemplary embodiment, the duty cycle of converter switches 136 is increased 206 linearly from a first converter duty cycle of about zero to an operating, or second converter duty cycle. Alternatively, the duty cycle of converter switches 136 is increased 206 using any other suitable rate or function that enables power converter 104 to function as described herein.

In the exemplary embodiment, the rate of the converter duty cycle increase is at least partially based on an inductance of boost inductors 120 and/or a current flowing through inductors 120. In one embodiment, the duty cycle of converter switches 136 is increased 206 from about zero to the operating converter duty cycle over a period of about one second. Alternatively, the duty cycle may be increased to the operating converter duty cycle over any other suitable period of time.

As converter controller 166 gradually increases 206 the duty cycle of converter switches 136, the voltage across DC bus 132 (shown in FIG. 1) is gradually increased as a result of an increased amount of current flowing through converter switches 136 from solar array 102. After the duty cycle of inverter switches 150 has reached the operating inverter duty cycle and the duty cycle of converter switches 136 has reached the operating converter duty cycle, power converter 104 begins 208 normal operation to maximize a power output of solar array 102. Power converter 104 then supplies 210 power from solar array 102 to electrical distribution network 106. Power converter 104 is maintained in the normal operating state until a shutdown sequence is executed and/or another suitable sequence is executed.

FIG. 3 is a flow diagram of an exemplary method of operating power converter 104 (shown in FIG. 1) during a shutdown sequence of converter 104. In the exemplary embodiment, method 300 is implemented by control system 164, such as by converter controller 166 and/or inverter controller 168 (all shown in FIG. 1), in response to an occurrence of a shutdown event and/or a low irradiance event. Alternatively, method 300 may be implemented by any other system that enables power converter 104 to function as described herein.

As used herein, the term "shutdown event" refers to an event in which a command signal is received from control system 164 and/or another system or device to disable power converter 104 in preparation for electrically decoupling solar array 102 (shown in FIG. 1) from electrical distribution network 106. As used herein, the term "low irradiance event" refers to an event in which the irradiance of solar array 102 is detected to be below the predefined irradiance threshold. For example, in low sunlight conditions, such as during a cloudy day or at night, the irradiance of solar array 102 may be reduced below the predefined irradiance threshold. The irradiance may be determined by one or more sensors (not shown) within or coupled to solar array 102, and/or may be determined based on the current detected by first input current sensor 122, second input current sensor 124, and/or third input current sensor 126 (shown in FIG. 1).

In the exemplary embodiment, during normal operation, converter switches 136 (shown in FIG. 1) are operated 302, or switched, at a first converter duty cycle. More specifically, converter switches 136 are controlled by converter controller 166 to switch at the first converter duty cycle or a first range of converter duty cycles, for example, to maximize a power output of solar array 102. In addition, inverter switches 150 (shown in FIG. 1) are operated 304, or switched, at a first inverter duty cycle. More specifically, inverter switches 150 are controlled by inverter controller 168 to switch at the first inverter duty cycle or a first range of inverter duty cycles, for example, to transmit energy from DC bus 132 (shown in FIG. 1) to electrical distribution network 106.

Converter controller 166 gradually reduces 306 the duty cycle of converter switches 136. The voltage across DC bus 132 (shown in FIG. 1) is gradually reduced as a result of a reduced amount of current flowing through converter switches 136. Energy stored within boost inductors 120 (shown in FIG. 1) is controllably released or transmitted to DC bus 132 and to electrical distribution network 106 (shown in FIG. 1) by boost converter 128 and inverter 130.

In the exemplary embodiment, the duty cycle of converter switches 136 is reduced 306 linearly from the operating, or first converter duty cycle to a shutdown, or second converter duty cycle of about zero. Alternatively, the duty cycle of converter switches 136 is reduced 306 using any other suitable rate or function that enables power converter 104 to function as described herein. In the exemplary embodiment, the rate of the converter duty cycle reduction is at least partially based on an inductance of boost inductors 120 and/or a current flowing through inductors 120. In one embodiment, the duty cycle of converter switches 136 is reduced 306 from the operating duty cycle to about zero over a period of about one second. Alternatively, the duty cycle may be reduced to about zero over any other suitable period of time.

After the duty cycle of converter switches 136 has been reduced 306 to about zero (and the current flowing through converter switches 136 has been reduced to about zero), the duty cycle of inverter switches 150 is gradually reduced 308 by inverter controller 168. In the exemplary embodiment, the duty cycle of inverter switches 150 is reduced 308 linearly from the operating, or first inverter duty cycle to a shutdown, or second inverter duty cycle of about zero. Alternatively, the duty cycle of inverter switches 150 is reduced 308 using any other suitable rate or function that enables power converter 104 to function as described herein.

In the exemplary embodiment, the rate of the inverter duty cycle reduction is at least partially based on characteristics or operating parameters of electrical distribution network 106. In one embodiment, the duty cycle of inverter switches 150 is reduced 308 from the operating duty cycle to about zero over a period of about one second. Alternatively, the duty cycle may be reduced to about zero over any other suitable period of time.

In an alternative embodiment, the duty cycle of inverter switches 150 is gradually reduced 308 while the duty cycle of converter switches 136 is being reduced 306. For example, the duty cycle of inverter switches 150 may be reduced 308 after the duty cycle of converter switches 136 is below a predetermined threshold, or after a predetermined time period has elapsed from the time that converter controller 166 commences reducing 306 the duty cycle of converter switches 136.

After the duty cycles of converter switches 136 and inverter switches 150 have been reduced to about zero, protection device 110 is opened, thus electrically decoupling 310 solar array 102 from boost converter 128. Accordingly, current ceases flowing from solar array 102 through boost converter 128 to inverter 130 and power converter 104 is in a shutdown state. Power converter 104 is maintained in the shutdown state until a startup sequence is executed and/or another suitable sequence is executed.

As described herein with respect to FIGS. 2 and 3, control system 164 gradually adjusts the voltage across DC bus 132 during a shutdown sequence and/or a startup sequence of power converter 104. For example, during a startup sequence, control system 164 gradually increases the duty cycles of converter switches 136 and inverter switches 150 to gradually increase the voltage across DC bus 132 and gradually increase the power supplied to electrical distribution network 106. During a shutdown sequence, control system gradually reduces the duty cycles of converter switches 136 and inverter switches 150 to gradually reduce the voltage across DC bus 132 and gradually reduce the power supplied to electrical distribution network 106.

A technical effect of the systems and methods described herein includes at least one of (a) electrically coupling a solar panel array to a converter including a plurality of converter switches, wherein the converter is coupled to an inverter including a plurality of inverter switches; (b) gradually increasing a duty cycle of a plurality of inverter switches; (c) gradually increasing a duty cycle of a plurality of converter switches; and (d) supplying power from a solar panel array to an electrical distribution network.

At least one other technical effect of the systems and methods described herein includes at least one of (a) operating a plurality of converter switches at a first converter duty cycle, wherein the plurality of converter switches are included within a converter, and wherein the converter is coupled to a solar panel array; (b) operating a plurality of inverter switches at a first inverter duty cycle, wherein the plurality of inverter switches are included within an inverter; (c) gradually reducing a duty cycle of a plurality of converter switches; (d) gradually reducing a duty cycle of a plurality of inverter switches; and (e) electrically decoupling a solar panel array from a converter.

Exemplary embodiments of a power converter system and methods for operating a power converter system are described above in detail. The power converter system and methods are not limited to the specific embodiments described herein, but rather, components of the power converter system and/or steps of the methods may be utilized independently and separately from other components and/or steps described herein. For example, the power converter system may also be used in combination with other power generation systems and methods, and is not limited to practice with only the solar power system as described herein. Rather, the exemplary embodiment can be implemented and utilized in connection with many other renewable energy and/or power generation applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter system comprising:
   a converter configured to be coupled to a power generation unit for receiving power from the power generation unit, said converter comprises a plurality of converter switches;
   a bus coupled to said converter, wherein a voltage is generated across said bus when electricity is conducted through said power converter system;
   an inverter coupled to said bus and configured to supply power to an electrical distribution network; and,
   a control system coupled to said converter and to said inverter, said control system configured to gradually adjust the voltage across said bus by adjusting a duty cycle of said plurality of converter switches during at least one of a shutdown sequence and a startup sequence of said power converter system, wherein said plurality of converter switches are switched at a first converter duty cycle, said control system is configured to at least one of gradually reduce the duty cycle of said plurality of converter switches to a second converter duty cycle of about zero at a substantially linear rate during the shutdown sequence and gradually increase the duty cycle of said plurality of converter switches to the second converter duty cycle at a substantially linear rate during the startup sequence.

2. A power conversion system in accordance with claim 1, wherein said inverter comprises a plurality of inverter switches, said control system is further configured to adjust a duty cycle of said plurality of inverter switches during at least one of the shutdown sequence and the startup sequence.

3. A power converter system in accordance with claim 2, wherein said plurality of inverter switches are switched at a first inverter duty cycle, said control system gradually reduces the duty cycle of said plurality of inverter switches to a second inverter duty cycle of about zero during the shutdown sequence.

4. A power converter system in accordance with claim 3, wherein said control system reduces the duty cycle of said plurality of inverter switches to about zero at a substantially linear rate.

5. A power converter system in accordance with claim 2, wherein said plurality of inverter switches have a first inverter duty cycle of about zero, said control system gradually increases the duty cycle of said plurality of inverter switches to a second inverter duty cycle during the startup sequence.

6. A power converter system in accordance with claim 5, wherein said control system increases the duty cycle of said plurality of inverter switches at a substantially linear rate.

7. A method of operating a power converter system, said method comprising:
   electrically coupling a solar panel array to a converter including a plurality of converter switches, wherein the converter is coupled to an inverter including a plurality of inverter switches;
   gradually increasing a duty cycle of the plurality of inverter switches;
   gradually linearly increasing a duty cycle of the plurality of converter switches; and,
   supplying power from the solar panel array to an electrical distribution network.

8. A method in accordance with claim 7, wherein said gradually increasing a duty cycle of the plurality of inverter switches comprises linearly increasing a duty cycle of the plurality of inverter switches.

9. A method in accordance with claim 7, further comprising determining an occurrence of at least one of a startup event and a high irradiance event before electrically coupling the solar array to the converter.

10. A method in accordance with claim 7, wherein the duty cycle of the plurality of converter switches is gradually increased after the duty cycle of the plurality of inverter switches reaches an operating inverter duty cycle.

11. A method of operating a power converter system including an inverter and a converter, said method comprising:
   operating a plurality of converter switches at a first converter duty cycle, wherein the plurality of converter switches are included within the converter, and wherein the converter is coupled to a solar panel array;
   operating a plurality of inverter switches at a first inverter duty cycle, wherein the plurality of inverter switches are included within the inverter;
   gradually linearly reducing a duty cycle of the plurality of converter switches;
   gradually reducing a duty cycle of the plurality of inverter switches;
   and,
   electrically decoupling the solar panel array from the converter.

12. A method in accordance with claim 11, wherein said gradually reducing a duty cycle of the plurality of inverter switches comprises linearly reducing a duty cycle of the plurality of inverter switches.

13. A method in accordance with claim 11, further comprising determining an occurrence of at least one of a shutdown event and a low irradiance event before gradually reducing the duty cycle of the plurality of converter switches.

* * * * *